United States Patent [19]

Benesh

[11] Patent Number: 5,494,407
[45] Date of Patent: Feb. 27, 1996

[54] WIND TURBINE WITH SAVONIUS-TYPE ROTOR

[76] Inventor: Alvin H. Benesh, 120 S. Adams Ave., Pierre, S. Dak. 57501

[21] Appl. No.: 357,701

[22] Filed: Dec. 16, 1994

[51] Int. Cl.$^6$ ............................................. F03D 3/06
[52] U.S. Cl. ........................ 416/197 A; 416/DIG. 2; 416/DIG. 9
[58] Field of Search ................. 416/197 A, 243, 416/DIG. 2, DIG. 9; 415/2.1, 4.1–4.5, 905, 907

[56] References Cited

U.S. PATENT DOCUMENTS

| 274,541 | 2/1883 | Zwiebel. |
| 1,413,411 | 4/1922 | Lloyd et al.. |
| 1,766,765 | 6/1930 | Savonius. |
| 2,007,963 | 7/1935 | Cleveland. |
| 4,005,947 | 2/1977 | Norton et al.. |
| 4,037,983 | 7/1977 | Poeta. |
| 4,039,849 | 8/1977 | Mater et al.. |
| 4,288,200 | 9/1981 | O'Hare. |
| 4,359,311 | 11/1982 | Benesh. |
| 4,362,470 | 12/1982 | Locastro et al.. |
| 4,474,529 | 10/1984 | Kinsey. |
| 4,715,776 | 12/1987 | Benesh. |
| 4,784,568 | 11/1988 | Benesh. |
| 4,830,570 | 5/1989 | Benesh. |
| 4,838,757 | 6/1989 | Benesh. |

FOREIGN PATENT DOCUMENTS

| 37015 | 1/1927 | Denmark. | |
| 65940 | 12/1924 | Finland. | |
| 658943 | 6/1929 | France. | |
| 727519 | 6/1932 | France. | |
| 797106 | 10/1935 | France. | |
| 0961999 | 5/1950 | France | 416/DIG. 9 |
| 2286955 | 4/1976 | France. | |
| 2468003 | 4/1981 | France. | |
| 2522074 | 8/1983 | France. | |
| 821930 | 11/1951 | Germany. | |
| 1628140 | 2/1970 | Germany. | |
| 1916460 | 10/1970 | Germany. | |
| 60-145464 | 7/1985 | Japan. | |
| 270858 | 3/1926 | United Kingdom. | |
| 1518151 | 7/1978 | United Kingdom. | |
| WO81/03683 | 12/1981 | WIPO. | |

OTHER PUBLICATIONS

Augmentation of Power in Slow-Running Vertical-Axis Wind Rotors Using Multiple Vanes, Sivasegaram et al., Wind Engineering, vol. 7, No. 1, 1983, pp. 12–19.
Design of a Prototype Improved Savonius Rotor: "As A System Totality", Rao, pp. 967–973 (no date).
Article entitled "Vertical Axis Wind Rotors–Status and Potential", from Wind Energy Conservation, pp. 28–29 (no date, but published prior to date of application).
"The Savonius Super Rotor!" by Michael Hackleman reprinted from the Mother Earth News, No. 193 (no date, but published prior to date of application).
Mechanical Engineering, Vo. 53, May 1931, No. 5, "The S-Rotor and Its Applications" by Savonius.
The Wind Power Book by Jack Park, 1981, pp. 93–95.
Newsletter 1, A Supplement to Wind and Wind Spinners, Jul. 1975, pp. 1–26.
"Wind Tunnel Performance Data for Two-and Three-Bucket Savonius Rotors", Report No. SAND 76-0131, Jul., 1977 authored by Blackwell, et al.
Paper Presented at the Second International Symposium on Wind Energy Systems, held in Amsterdam, Netherlands, Oct. 3rd–6th, 1978, vol. 2, pp. F3-30 to F3-34.

Primary Examiner—Edward K. Look
Assistant Examiner—Christopher Verdier
Attorney, Agent, or Firm—Merchant, Gould, Smith, Edell, Welter & Schmidt

[57] ABSTRACT

A Savonius rotor assembly includes two blades. Each of the blades has an outer edge and an inner edge with the outer edges of the blades lying on a circle which define the diameter of the rotor. Each of the blades has a linear portion adjacent to the inner edge and a first curved portion which is substantially an arc of a circle tangent to the linear portion and tangent to the circle defining the rotor diameter. A second curved portion is substantially coincident to the circle defining the rotor diameter.

8 Claims, 2 Drawing Sheets

WIND TURBINE WITH SAVONIUS-TYPE ROTOR

I. BACKGROUND OF THE INVENTION

1. Field of the Invention

This invention pertains to a wind turbine. More particularly, this invention pertains to a wind turbine with a Savonius-type rotor assembly.

2. Description of the Prior Art

Savonius-type rotors are well known. Examples of such are illustrated in U.S. Pat. No. 4,784,568 and U.S. Pat. No. 4,359,311. The rotor blades are generally semi-cylindrical in shape in contrast to conventional turbines which have inner edges of the blades fixed to adjoining blades or to a central core, drum or shaft. In the design and development of Savonius rotors, the geometry of the rotor blades impacts on the power coefficient of the rotor. Accordingly, the development of blade geometry is an ongoing development for the purpose of improving the performance of Savonius rotors. It is an object of the present invention to provide a Savonius rotor assembly having blades with a geometry which enhance the power coefficient of the rotor.

II. SUMMARY OF THE INVENTION

According to a preferred embodiment of the present invention, a Savonius rotor is provided having first and second blades. Each of the blades includes an outer and an inner edge with respect to a central vertical axis. The outer edge of the blades lie on a circle defining a diameter of the rotor.

Each blade includes a substantially linear portion adjacent to the inner edge. Each of the blades also includes a first curved portion which is substantially an arc of a circle and which is tangent to the substantially linear portion as well as being tangent to the circle defining the diameter of the rotor. Further, each of the blades includes a second curved portion which is tangent to the first curved portion and substantially coincident with the diameter of the rotor.

III. BRIEF DESCRIPTION OF THE DRAWINGS

IV. DESCRIPTION OF THE PREFERRED EMBODIMENT

U.S. Pat. No. 4,784,568 which issued on Nov. 15, 1988, to the inventor of the present application, provides a thorough description of a Savonius rotor and operation of a Savonius rotor. Accordingly, that patent and its teachings and drawings are incorporated herein by reference with the present application directed to an explanation of modifications of the rotor according to the present invention.

Figure 1:
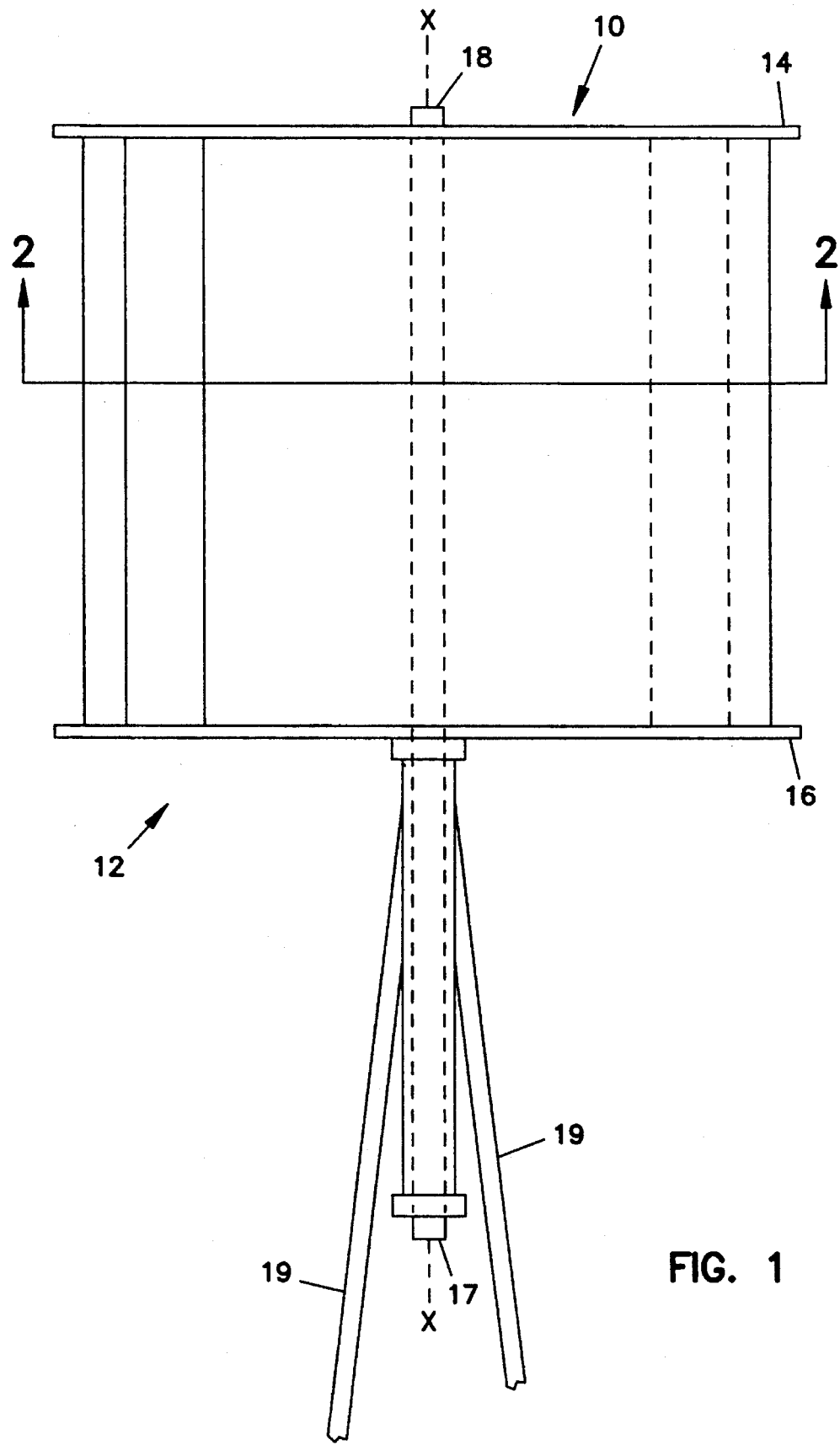
FIG. 1 is a side elevation view of a Savonius rotor and turbine assembly according to the present invention.
Figure 2:
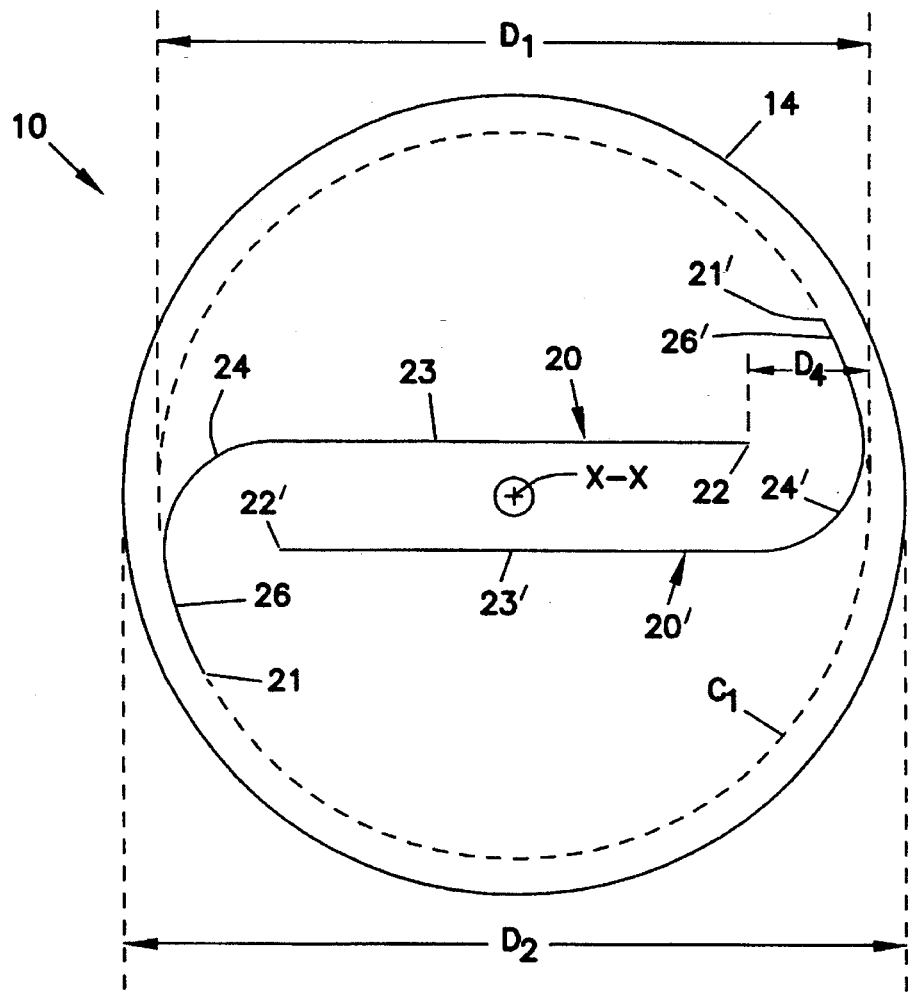
FIG. 2 is a diagrammatic view of a preferred embodiment of a two-blade Savonius-type rotor in accordance with the principals in the present invention and taken generally along line 2—2 of FIG. 1.

With reference to FIGS. 1 and 2, the present invention is for a Savonius rotor assembly 10 for use in a turbine 12. The rotor 10 includes a first blade 20 and a second blade 20' Each of blades 20 and 20' are identical and a description of one will suffice as a description of the other. For purposes of clarity of illustration, each of blades 20, 20' is identically numbered, except that the elements of blade 20' are distinguished from those of blade 20 by the addition of an apostrophe to the element number.

The blades 20, 20' are secured to and extend between upper and lower plates 14, 16. The assembly of the blades 20, 20' and plates 14, 16 is axially mounted on a rod 18 such that the assembly 10 and rod 18 may rotate about the vertical axis X—X of the rod 18. The rod 18 is secured by supports 19. The lower end 17 of the rod 18 rotates with the rotor 10 such that the lower end 17 may be coupled to a generator or the like for generating electricity or may be coupled to a pump.

Figure 3:
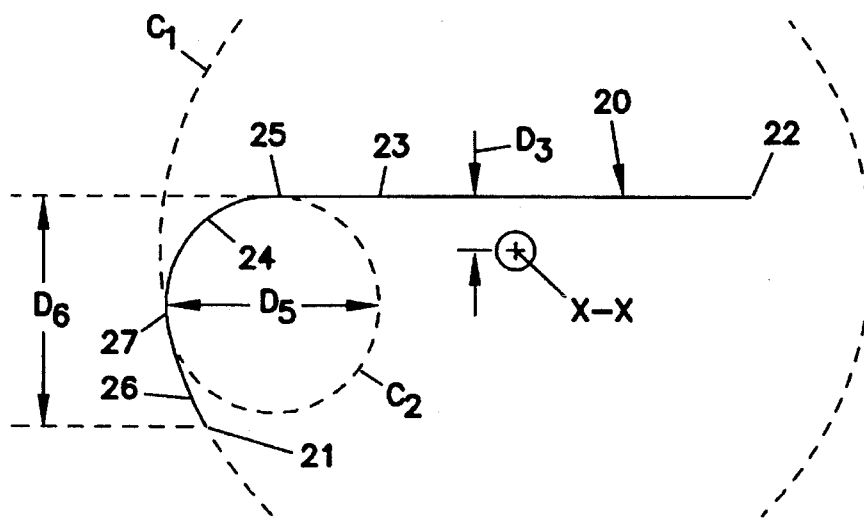
FIG. 3 is a diagrammatic view of a rotor blade of the embodiment shown in FIG. 2.

With reference to FIG. 3, rotor blade 20 is shown separately and includes an outer edge 21 and an inner edge 22. As the rotor 10 rotates about axis X—X the outer edge 21 moves in the path of a circle $C_1$ having a diameter $D_1$. For the purpose of describing the present invention, the diameter $D_1$ will be described as the diameter of the rotor 10.

As shown, the plates 14, 16 have a diameter $D_2$ greater than the diameter $D_1$. In a preferred embodiment, the diameter $D_2$ of the plates 14, 16 is approximately 1.1 times the diameter $D_1$.

In FIG. 3, the rotor includes a straight linear portion 23 extending from end 22 to a point 25. The linear portion 23 is a spaced from the axis X—X by a distance $D_3$, and (as shown in FIG. 2) it is spaced from circle $C_1$ by a distance $D_4$ (measured along a line extending from point 22 on linear portion 23).

The rotor 20 further includes a first curved portion 24. First curved portion 24 is substantially an arc of a circle. The first curved portion 24 has a first end at point 25 which is tangent to the substantially linear portion 23. The first curved portion 24 has a second end at a point 27 which is substantially tangent to the circle $C_1$.

The rotor 20 further includes a second curved portion 26 extending from point 27 and terminating at end 21. The second curved portion 26 at point 27 is substantially tangent to the first curved portion 24. Further, the second curved portion 26 is substantially coincident with circle $C_1$ (i.e., it lies on circle $C_1$). A distance $D_6$ is the length between linear line 23 extended, and a point 21, measured on a straight line at right angle to extended line 23.

In order to achieve desired performance, the various dimensions $D_2$–$D_6$, are all ratios of the rotor diameter $D_1$. Specifically, the dimensions are as follows:

| Dimension | Ratio of Rotor Diameter |
| --- | --- |
| $D_1$ | 1 $D_1$ |
| $D_2$ | 1.1 $D_1$ |
| $D_3$ | .075 $D_1$ |
| $D_4$ | .172 $D_1$ |
| $D_5$ | .3 $D_1$ |
| $D_6$ | .32 $D_1$ |

In FIG. 3, the diameter of the circle $C_2$ on which the first curved portion 24 resides is $0.3 D_1$. The straight line distance $D_6$ between the extension of the straight portion 23 and end 21 is $0.32 D_1$.

Presently, it is generally accepted that Savonius rotors should be built only in small sizes. However, due to the fact that the present rotor includes parallel plane sections, which may be of considerable length, the rotor of the present invention may be fabricated with the linear portions of the blades as very lightweight truss sections covered with much lighter material than would be used in classic Savonius rotors. As a result, Savonius rotors can be economically built larger than possible with classic Savonius rotors.

With the teachings of the present invention, various embodiments and modifications are possible by changing the diameter of the curved portion which is the arc of a circle which is tangent to a straight portion and tangent to a circumference of the rotor. As a result, a family of blade profiles that give high efficiency can be developed. The amount of efficiency is adjusted by changing the diameter of the circle (i.e., by changing $D_5$). The dimensions $D_4$ and $D_6$ are related to the diameter of the circular arc $D_5$. Therefore, to obtain optimum results when the diameter of the arc $D_5$ is changed, optimum dimensions $D_4$ and $D_6$ can be developed empirically.

A diameter of $0.3D_1$ is selected as the preferred embodiment for the present invention because that diameter is believed to give optimum results. It is believed that if there is a significant increase in size of the circle above this ratio, the power co-efficient of the rotor is reduced. A preferred embodiment presents a power coefficient which is significantly greater than previous Savonius rotors.

| ROTOR DESIGN | POWER CO-EFFICIENT |
| --- | --- |
| Highest rated Savonius rotor tested by United States Government at Sandia Laboratories in 1975. | 0.244 |
| U.S. Pat. No. 4,784,568 | 0.33 |
| The preferred embodiment of the present application | 0.37 |

The rotor of the present invention self starts with the wind from any direction relative to the orientation of the rotor blades.

To simplify making the layout of the rotor blade profile the following steps can be followed:
1. Decide on the size of rotor desired, which is $D_1$ (the diameter of the path of rotor blade tips), and draw the circle on a sheet.
2. Draw two parallel straight lines on the layout, each spaced a distance of $0.075D_1$ from the rotor center.
3. Cut a pattern of a circle with a diameter of $0.3D_1$.
4. Lay the pattern of the circle on the drawing, positioned so that it is tangent to the rotor diameter and one of the parallel lines as shown in FIG. 3, and trace the semicircle as shown.
5. Extend the length of blade along the rotor circumference as shown in FIG. 3, Item 26, so that length $D_6$ is $0.32D_1$.
6. Extend the linear portion of each blade so that the distance $D_4$ on FIG. 2 is $0.172D_1$. This distance is measured to the rotor circumference.

Having described the present invention of the preferred embodiment, it will be appreciated that modifications and equivalents such as those which readily occurred to one skilled in the art are intended to be included within the scope of the present claims.

What is claimed is:
1. A Savonius rotor assembly driven by a moving fluid, said assembly comprising:

a support;
a rotor mounted on the support for rotation about an axis, the rotor including a first blade and a second blade disposed symmetrically about the axis, the rotor having a cross section defined by a plane perpendicular to the axis, the rotor in the cross section including the first and second blades, each having:
an outer edge and an inner edge with the outer edge moving in a path of a first circle around said axis, said circle defining a diameter of the rotor;
a substantially linear portion extending from the inner edge toward said outer edge and terminating at a first location, said inner edge extending substantially beyond said axis on a side thereof opposite said outer edge and spaced from said first circle by a distance less than about 0.2 times said diameter, said linear portions of said first and second blades being substantially parallel;
a first curved portion which is substantially an arc of a second circle, said first curved portion tangent to the substantially linear portion at said first location, said first curved portion terminating at a second location, said first curved portion tangent to said first circle at said second location; and
a second curved portion tangent to the first curved portion at said second location and substantially coincident with said first circle.
2. A Savonius rotor assembly according to claim 1, wherein the diameter of the second circle is 0.30 of the diameter of the rotor.
3. A Savonius rotor assembly according to claim 1, wherein the substantially linear portions of the first and second blades are spaced apart a distance of 0.15 of the diameter of the rotor.
4. A Savonius rotor assembly according to claim 1, wherein the inner edge is a distance of 0.172 of the diameter of the rotor measured on a line extending from the inner edge to the first circle in a direction parallel to the substantially linear portion.
5. A Savonius assembly according to claim 1, wherein the outer edge of the first blade is a distance of 0.32 of the diameter of the rotor from an extension of the substantially linear portion of the first blade measured on a line extending from the outer edge to the extension of the substantially linear portion in a direction perpendicular to the extension of the substantially linear portion.
6. A Savonius rotor assembly according to claim 1, wherein the inner edge of the linear portion is a distance less than 0.35 of the diameter of the rotor measured on a line extending from the inner edge to the first circle in a direction parallel to the substantially linear portion.
7. A Savonius rotor assembly according to claim 1, wherein the diameter of the first curved portion is less than 0.52 of the diameter of the rotor.
8. A rotor assembly according to claim 1 wherein a distance between said linear portions of said first and second blades is less than 0.20 of said diameter.

* * * * *